Patented Feb. 13, 1923.

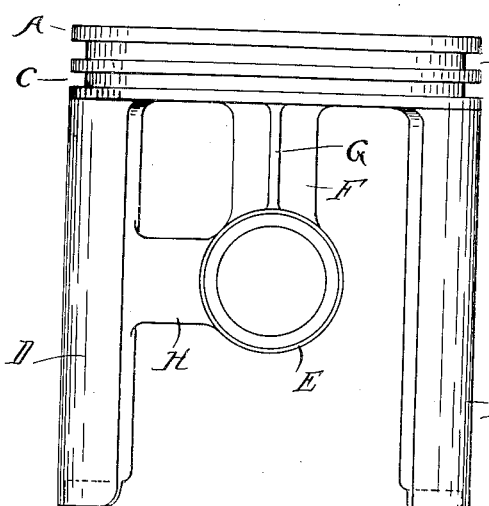
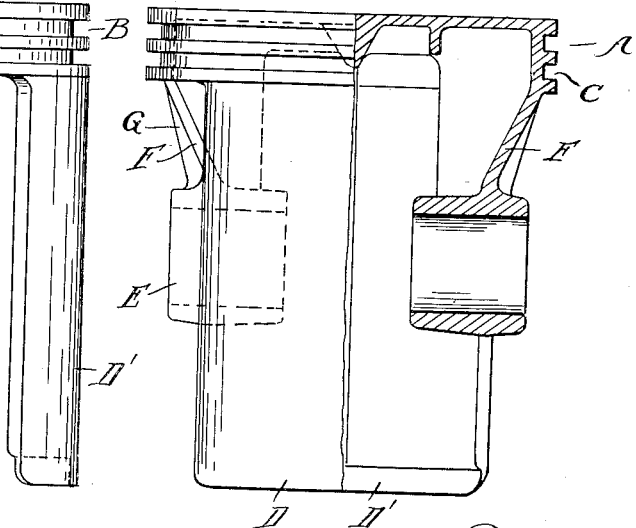
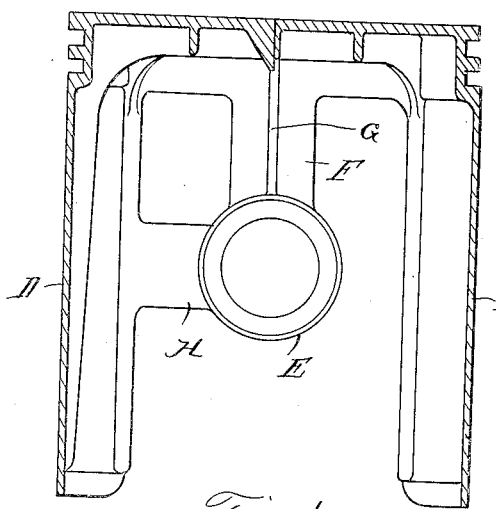
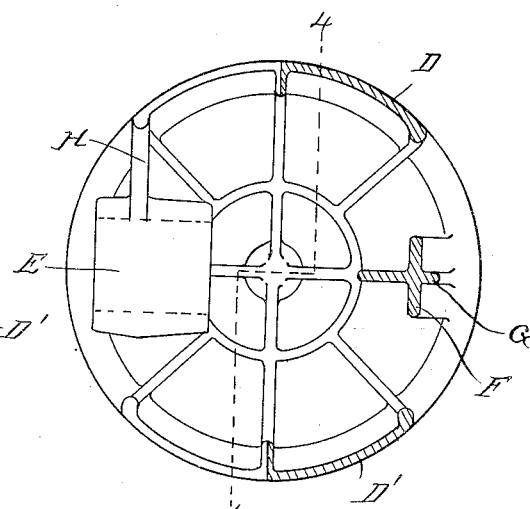

1,444,942

UNITED STATES PATENT OFFICE.

CHARLES C. ANDERSON, OF CEDAR RAPIDS, IOWA, ASSIGNOR TO THE ANDERSON PISTON COMPANY, OF BOWLING GREEN, OHIO, A CORPORATION OF OHIO.

PISTON.

Application filed August 27, 1921. Serial No. 495,967.

*To all whom it may concern:*

Be it known that I, CHARLES C. ANDERSON, a citizen of the United States of America, residing at Cedar Rapids, in the county of Linn and State of Iowa, have invented certain new and useful Improvements in Pistons, of which the following is a specification, reference being had therein to the accompanying drawings.

The invention relates to pistons more particularly designed for use in internal combustion engines and of that type shown in my prior Patent No. 1,283,021, issued October 29, 1918. The present invention consists in certain improved features of construction as hereinafter set forth.

In the drawings:

Figure 1 is a side elevation of the piston;

Figure 2 is a sectional elevation viewed at right angles to Figure 1;

Figure 3 is a sectional bottom plan;

Figure 4 is a longitudinal section on line 4—4 of Figure 3.

A is a piston head which is provided with a continuous annular skirt portion B grooved at C for the reception of packing rings and being of a diameter which provides abundant clearance between the same and the cylinder walls. D and D' are discontinuous segmental extensions of the skirt of a slightly larger diameter than the portion B so as to closely fit the walls of the piston. These segments are symmetrically arranged with respect to the central plane of the piston transverse to the axis of the wrist pin. E are sleeve bearings for the wrist pin, which are also symmetrically arranged with respect to the central plane and are centrally arranged between the segmental bearings D and D'.

To take care of the angular thrust of the piston rod when the piston is subjected to explosion pressures, the sleeve bearings E are provided with strut connections both to the head and to the segments subjected to side thrust under such pressures. On the other hand, to avoid possibility of seizure in the cylinder, due to the close fit of the segments, the opposite segment is free from any direct connection to the sleeve bearings. Thus, as shown, the transverse webs F and G connect the sleeves E with the piston head, and the webs H form direct strut connections between the sleeves and the segments D. The segment D' is connected to the sleeves only through the medium of the head and therefore is free to flex so as to compensate for any expansion due to heat or other cause.

What I claim as my invention is:

1. A piston comprising a head, a skirt having a ring portion of a diameter providing abundant clearance for the cylinder, segmental portions of greater diameter closely fitting the cylinder, sleeve bearings intermediate said segments, struts directly connecting said sleeve bearings with one of said segments and with said head, the other of said segments being free from direct connection to said sleeves.

2. A piston comprising a head having an annular skirt portion grooved to receive one or more piston rings and of a diameter affording abundant clearance in the cylinder, discontinuous segments extending from said annular skirt on opposite sides thereof and of a diameter to closely fit the cylinder, sleeve bearings intermediate said segments, transverse webs connecting said sleeve bearings directly with said head, and struts connecting said sleeve bearings directly with one of said segments, the other of said segments being free from direct connection to permit of independent flexing.

3. A piston comprising a head, a skirt having a ring portion, of a diameter providing abundant clearance for the cylinder, segmental portions of greater diameter closely fitting the cylinder, bearings intermediate said segments, means connecting said bearings with one of said segments and with said head, the other of said segments being free from direct connection to said bearings.

In testimony whereof I affix my signature.

CHARLES C. ANDERSON.